Patented Nov. 25, 1947

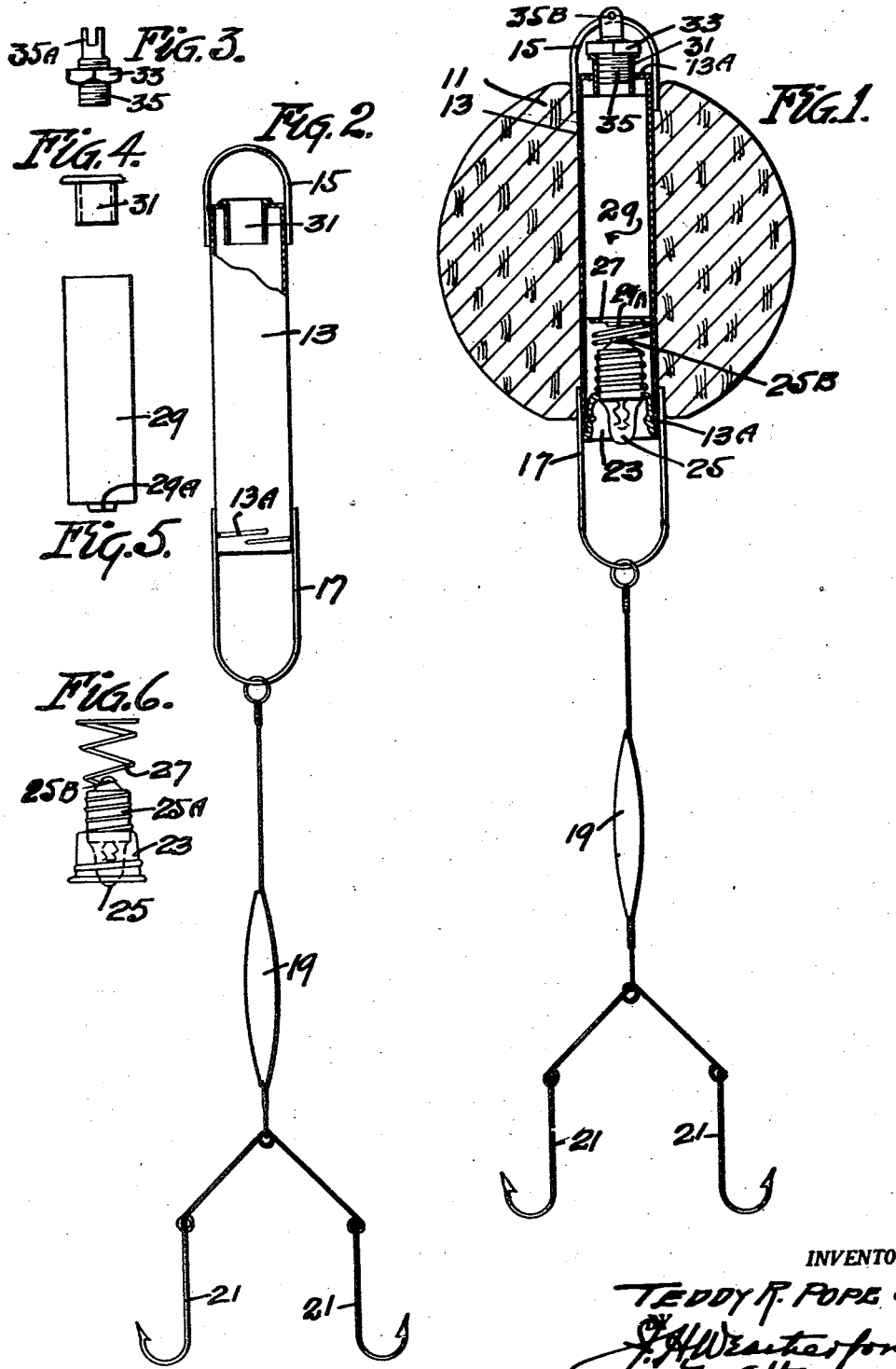

2,431,420

UNITED STATES PATENT OFFICE 2,431,420

ILLUMINATED FISHING LURE

Teddy R. Pope, Sr., Memphis, Tenn.

Application January 23, 1946, Serial No. 642,840

2 Claims. (Cl. 43—44)

This invention relates to illuminating devices for fishermen who use a pole and line, and ordinarily bait with minnows or other live bait.

It has particular reference to a lighting unit which will directly illuminate the bait and attract the fish thereto.

The primary object of the invention is:

To provide a simple and efficient device for directing a light on the bait in pole fishing and one in which the light may be used only when desired.

The means by which the foregoing and other objects are accomplished, and the manner of their accomplishment, will readily be understood from the following specification upon reference to the accompanying drawings, in which:

Fig. 1 is a sectional elevation of the illuminating device with supporting float and attached sinker and hooks.

Fig. 2 is an elevation of the casing of the unit with sinker and hooks attached, the casing having a portion of its upper end in section; and Figs. 3, 4, 5 and 6 are elevations of the various parts of the unit which are carried by, and are housed in the casing.

Referring now to the drawings in which the various parts are indicated by numerals:

11 is a float, here indicated as cork, having a bore which houses and frictionally holds a tubular casing 13, to the upper and lower ends of which casing bails 15 and 17, preferably of wire, are solidly secured. Depending from the bail 17 is a line-carried sinker 19, as of lead, from and below which hooks 21 depend and are adapted to carry such bait as the fisherman may elect.

The lower end of the casing is open and threaded to receive a thimble 23 having complementary threads, which thimble carries a light bulb 25. The bulb has the usual threaded shank portion 25A, to which is secured a coil spring 27 which projects beyond the contact 25B of the bulb. 29 is a dry cell battery which is disposed in the casing and seated against the spring 27, the contact 29A of the battery being normally held by the spring 27 away from engagement with the contact 25B of the bulb.

A sleeve 31 is slidably carried by the upper end of the casing 13 and is seated against the end of the battery 29 opposite to the contact end, this sleeve 31 extending beyond the upper end of the casing which may be provided with an apertured head 13A, or an inwardly extending flange to guide the sliding movement of the sleeve.

Seated against the upper and outer end of the sleeve 31 is a nut 33 which is carried by a threaded member 35, this member having a forked end 35A which is adapted to engage with and seat against the bail 15 as an abutment, and is provided with holes 35B through which a fishing line, not shown, may be secured. The member 35 slidably fits within the sleeve 31 and cooperates therewith to provide a combination means mounted on and carried by the upper end of the casing 13, which combination means abut the upper end of the battery through the sleeve 31 and the upper bail 15 through the fork 35A. It will be seen that this combination is extensible by running the nut 33 down the member 35, moving the sleeve 31 along the member 35 and away from the fork 35A.

In assembling the device, the battery 29 is placed in the casing 13 with the contact end 29A of the battery facing the open end of the casing, the bulb thimble 23, with bulb therein, is screwed into the open end of the casing, the spring 27 resiliently urging the contact portions 29A of the battery, and 25B of the bulb apart. The sleeve 31 is inserted in the opposite end of the casing, the threaded member 35 inserted therein, the sleeve 31 being pushed into the casing, the spring 27 being compressed by the consequent movement of the battery and the forked end 35A positioned below the bail. The force being exerted on the members is then released, the spring 27 urging the forked end 35A into engagement with the bail.

A suitable fishing line is threaded through the holes 35B in the forked end of the member 35 and the device is ready for use.

The hooks 21 are baited with conventional bait or lure and just prior to lowering them into the water, the nut 33 is run down the threaded portion of member 35 to effect engagement between the contacts 29A of the battery and 25B of the bulb and energize the light the sleeve 31 being extended downwardly into the casing effecting downward movement of the battery and compressing spring 27. The rays of the light are directed downward and reflected by the inner surface of the thimble 23, more or less in the same direction, to illuminate the hooks and the bait thereon. The device is then lowered into the water with the bait so illuminated that the fish may be attracted thereto and fishing proceeds. From time to time when the battery is exhausted, the line is raised and the bulb thimble and bulb are removed and a new battery inserted.

It will be understood that under usual conditions the casing and the hooks depending therefrom are supported by the float 11. Where, however, it is desired to do deep fishing, or where the fisherman otherwise so desires, the float may be removed and the device entirely supported by the line.

It will be seen that the sinker depending from the open end of the casing insures that the casing will hang in a vertical position and the light be directed toward the hooks below, and this whether the float be used or not.

I claim:

1. A fishing lure, including an elongated tubular casing having its lower end open and its upper end inwardly flanged, and bails secured to and extending longitudinally from its opposite ends, a battery disposed in said casing with its contact end facing the lower end of said casing, a light bulb secured in the open end of the casing and facing downward, a coil spring interposed within said casing between said bulb and said battery and resiliently urging contact portions of said bulb and said battery apart, a sleeve disposed through said upper end and centered by said flange, a threaded member disposed within said sleeve and extending into abutting relation with the upper of said bails, a nut on said member seated against the upper end of said sleeve and adapted to be screwed along said threaded member to effect engagement of said battery and bulb contact portions to effect energization of said bulb, a line and sinker depending from said lower bail, and a hook carried by said line below said sinker and illuminated by said bulb.

2. A fishing lure, including an elongated casing having its lower end open, and bails secured to and extending longitudinally from its opposite ends; a battery disposed in said casing with its contact end facing the open end of said casing, and a light bulb secured in the open end of the casing and facing downward, a coil spring interposed within said casing between the bulb and the battery and resiliently urging the contact ends of said bulb and said battery apart, means carried by the upper end of said casing and oppositely abutting against said battery and the upper of said bails, manually extensible to effect engagement between said battery and bulb contacts and effect energization of said bulb, a line and sinker carried by the lower of said bails and depending therebelow, and hooks carried by said line below said sinker and illuminated by said bulb.

TEDDY R. POPE, Sr.

REFERENCES CITED

The following references are of record in the file of this patent:

UNITED STATES PATENTS

| Number | Name | Date |
|---|---|---|
| 757,077 | Whipple | Apr. 12, 1904 |
| 1,986,683 | Schmeltzer | Jan. 1, 1935 |
| 2,002,135 | Barton | May 21, 1935 |
| 2,236,215 | Klinitski | Mar. 25, 1941 |